United States Patent [19]

Bergland et al.

[11] 3,763,624
[45] Oct. 9, 1973

[54] METHOD OF PREVENTING POLYURETHANE SEALANT FROM GELLING PREMATURELY IN CONTAINERS

[75] Inventors: John Bergland, Toledo, Ohio; Joseph C. Gould, Norwood, Pa.

[73] Assignee: E. I. du Pont de Nemours and Company, Wilmington, Del.

[22] Filed: Apr. 16, 1971

[21] Appl. No.: 134,895

[52] U.S. Cl............................. 53/37, 53/6, 252/194, 260/2.5 BB, 260/77.5 BB
[51] Int. Cl............................................ B65b 29/00
[58] Field of Search .................... 252/194; 53/6, 37; 260/2.5 BB, 45.8 N, 45.7 R, 45.9 R, 45.95, 77.5 SS, 33.6 UB, 33.80 B; 106/243

[56] References Cited
UNITED STATES PATENTS

| | | | |
|---|---|---|---|
| 2,970,123 | 1/1961 | Rhodes et al.................. | 260/77.5 SS |
| 3,280,049 | 10/1966 | Hyre et al..................... | 260/77.5 SS |
| 3,536,663 | 10/1970 | Oertel et al.................... | 260/2.5 BB |

FOREIGN PATENTS OR APPLICATIONS

| | | | |
|---|---|---|---|
| 1,367,580 | 6/1964 | France............................ | 260/2.5 BB |

Primary Examiner—Mayer Weinblatt
Assistant Examiner—Irwin Gluck
Attorney—John E. Griffiths

[57] ABSTRACT

An improved method of packaging polyurethane sealant compositions is provided. This method consists of adding a small amount of a curing inhibitor to a container over the sealant prior to sealing the containers with a lid or cap.

5 Claims, No Drawings ced
3,763,624

METHOD OF PREVENTING POLYURETHANE SEALANT FROM GELLING PREMATURELY IN CONTAINERS

BACKGROUND OF THE INVENTION

Single package polyurethane sealants have many useful functions such as caulking and sealing compounds and are especially useful in the construction and automotive industry. In order to facilitate the use of these sealants, manufacturers have packaged them in caulking tubes which are easily operated with a caulking gun. These tubes have a movable cap in the end of the caulking tube which is inserted after the tube has been filled with sealant. This cap is forced down the length of the tube by a compression plunger of the caulking gun thereby forcing out the polyurethane within the tube through an extrusion head.

The single package polyurethanes are normally cured by exposure to the atmosphere where moisture reacts with the isocyanate groups thereby cross-linking the composition. This reaction with the moisture in the atmosphere has caused difficulties with the sealant during packaging and in its packaged state. Packaging in an inert atmosphere delayed this problem until the tubes were removed from the inert atmosphere.

It was not economically or structurally feasible to design a caulking tube that would exclude all atmospheric moisture during storage. Moisture would ordinarily enter around the edge of the floating cap since it did not form a very good seal. Any moisture initiated the curing process thereby prohibiting the caulking tube from operating properly since the cap could not freely move within the tube.

The shelf life of such caulking tubes has been somewhat limited due to moisture leaks. This problem has been attacked by redesigning caulking tubes; however, as long as the cap must be free to move within the tube, an effective seal cannot be obtained. Obviously, it is not economically feasible to maintain an inert atmosphere around the tubes during storage and shipping.

SUMMARY OF THE INVENTION

This invention relates to an improved method of packaging moisture curable polymer urethane sealants in containers such as caulking tubes and cans.

This invention also relates to the articles produced by this improved process. The object of this invention is to eliminate premature moisture curing of the polyurethane sealant while it remains packaged in the container. In order to preclude the moisture in the air from reacting with the polyurethane and thereby effectuating a cure which hardens the sealant to a degree which would cause the sealant and the caulking tube to be useless, an effective amount of a cure inhibitor is added to containers containing such moisture curable polyurethane sealants. This cure inhibitor can be compounds such as alcohols, amines or naphthenic oils and should be added so that it remains in proximity with the polyurethane air interface. i.e., the area where possible extraneous moisture may seep in through a less than perfect seal of the container and subsequently initiate the curing process. In the case of caulking tubes the cure inhibitor can be added to the tube after the tube has been filled with the polyurethane and prior to the insertion of a floating cap or plunger which is used to force the sealant from the tube when used in combination with a caulking gun. In the case of large volume containers the cure inhibitor may be added to the surface of the polyurethane prior to sealing the container with a lid or other means.

DESCRIPTION OF THE INVENTION

This invention will work well with any moisture curable polyurethane sealant. Illustrative of such sealants are those described in U.S. Pat. Nos. 3,445,423, issued May 20, 1969; 2,948,645 and U. S. patent application Ser. No. 846,961, filed Aug. 1, 1969 and now abandoned, the disclosure of which is hereby incorporated by reference.

Once the sealant composition has been put in the container a small amount of cure inhibitor is added over the sealant just prior to sealing the container by the insertion of the floating cap or lid. This allows an inhibitor-isocyanate reaction to occur thereby effectively stabilizing the polyurethane sealant composition. The inhibitor reacts with the isocyanate groups, thereby capping these groups and preventing them from reacting with atmospheric moisture during or after the container sealing process.

The inhibitor isocyanate reaction produces a non-cross-linked tacky polymer instead of a solid cross-linked polymer which is the product of a moisture cure. Since only a very small percentage of the total sealant volume is affected, and since this affected sealant is at the bottom of a caulking tube, it is normally left in sealant application equipment and would not be extruded. In large volume cans, the tacky polymer can be easily skimmed off the surface. This tacky polymer layer need only be a few millimeters in thickness in order to preclude any moisture from passing through the inhibitor-isocyanate layer and prematurely curing the packaged polyurethane. Obviously what constitutes an effective amount of inhibitor will be governed by the surface area of sealant which may be exposed to moisture. For standard sized caulking tubes about 0.5 to 1.0 ml. of inhibitor will be sufficient.

Suitable cure inhibitors for use in the invention are alcohols having the general structure R-OH where R can be an alkyl group of 1–8 carbon atoms, preferably 1–5 carbons, amines having the general structure $R_1$-$NH_2$ where $R_1$ can be an aromatic radical of at least 6 carbons and hydrocarbon oils wherein at least 30 percent of the carbon atoms are naphthenic. An especially preferred oil is one in which about 40–60 percent of the carbon atoms are naphthenic, about 35–60 percent are paraffinic and about 0–5 percent (preferably less than 1 percent) are aromatic.

It is postulated that the presence of residual tin catalyst in the sealant causes the rate of the alcohol/isocyanate reaction to be faster than the isocyanate/water reaction and that the alcohol/isocyanate reaction is preferred. Of necessity, only lower molecular weight alcohols are preferred in order to keep the alcohol/isocyanate reaction the favored reaction.

Amines of the general structure $R_1$-$NH_2$ where $R_1$ can be an aromatic radical of at least 6 carbon atoms and naphthenic also works well in this invention in place of the alcohol. An especially suited amine is aniline. The effective amount of amine or naphthenic oil necessary to moisture stabilize a container of sealant is again determined by the surface area of sealant which may be exposed to moisture.

UTILITY

The use of cure inhibitors to retard the water/isocyanate reaction in moisture curable polyurethane compositions reduces the possibility of premature curing while it is stored. This safeguard greatly enhances the marketability of the product since the customer can depend on receiving usable sealant instead of a useless, already cured polyurethane.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept of the invention. All parts unless otherwise indicated are by weight.

EXAMPLE 1

To pint cans of Imron (E. I. du Pont de Nemours and Company registered trademark) (a moisture curable polyurethane composition) sealant were opened. Examination of the sealant in the can showed it to be of normal consistency, easy to spread, and free of jellation. To one of these cans, 2 ml. of anhydrous isopropanol were added and spread over the top of the sealant to ensure that the top of the sealant was covered by the alcohol. Nothing was added to the other which was used as the control.

To provide a humid atmosphere over the sealant, each can was covered with a paper towel and a lid placed loosely over the towel. One end of each paper towel was placed in a beaker of tap water and the water was allowed to continuously diffuse up the towel to provide a humid area over the sealant. The can lids served a dual function by preventing rapid evaporation of the water and also served to hold the towel in place. The cans were allowed to remain in the test atmosphere for 3 days. After this time they are examined. The control sample in which no anhydrous isopropanol was used had jelled approximately one-fourth inch thick across the top portion of the sealant which had been exposed to the moisturized air. This cured skin was very tough and had to be cut out of the can. The can that had the anhydrous isopropanol added to it showed no signs of jellation or skinning. The sealant had normal consistency and was easily troweled.

EXAMPLE 2

A number of conventional caulking tubes were filled with the polyurethane sealant of Example 1. Approximately one-half of these caulking tubes had 0.5 ml. of isopropanol added over the polyurethane sealant at the sealant-air interface before the sealing plunger was inserted into the tube. The remainder of the tubes had no alcohol added and were sealed in the conventional manner by the use of removable round plunger. The entire batch of filled caulking tubes was shelf stored for 30 days and then cut open to be examined at the polyurethane/plunger interface. The tubes having the isopropanol exhibited no jellation and were useful for their intended use as caulking compound. The tubes having no isopropanol added exhibited jellation at the interface of the sealant plunger where moist air apparently was able to seep in. This jellation prevented the caulking tubes from functioning in a normal caulking gun since the plunger could not be forced down the tube.

EXAMPLE 3

A test was performed in accordance with the procedure of Example 2 except that the isopropanol was replaced with a hydrocarbon oil having 40–60 percent of naphthenic carbon atoms, 35–60 percent paraffinic carbons and less than 1 percent aromatic carbon. The results were substantially identical with the tubes containing hydrocarbon oil remaining from premature curing at the plunger/polyurethane interface.

We claim:

1. In the process of packaging moisture curable polyurethane sealant compositions in containers by filling said containers with said sealant followed by sealing the container with a cap or lid, the improvement which comprises adding a curing inhibitor selected from the group consisting of aniline and a hydrocarbon oil having at least 30 percent naphthenic carbons capable of capping the isocyanate groups of the polyurethane over the surface of the sealant prior to the insertion of said cap or lid in an amount effective to retard moisture curing of the polyurethane.

2. The process of claim 1 wherein R the hydrocarbon oil has from 40 to 60 percent naphthenic carbons, 35 to 60 percent paraffinic carbons and 0 to 5 percent aromatic carbons.

3. The process of claim 2 wherein the container is standard caulking tube and wherein the amount of cure inhibitor added is from 0.5 to 1.0 ml.

4. The process of claim 3 wherein the cure inhibitor is a hydrocarbon oil having 40 to 60 percent naphthenic carbons, 35 to 60 percent paraffinic carbons and less than 1 percent aromatic carbons.

5. The package of the process of claim 1.

* * * * *